INVENTOR.
ROBERT C. PATTERSON
RUDOLPH J. MICHELLER
JOHN F. CARNEY
BY
John F. Carney
ATTORNEY Oct. 26, 1971  R. C. PATTERSON ET AL  3,614,863

CENTRIFUGAL SEPARATOR HAVING PERFORATED CAN WALL

Filed Dec. 31, 1968  2 Sheets-Sheet 2

INVENTOR.
ROBERT C. PATTERSON
RUDOLPH J. MICHELLER
JOHN F. CARNEY
BY

*John F. Carney*

ATTORNEY

United States Patent Office 3,614,863
Patented Oct. 26, 1971

3,614,863
CENTRIFUGAL SEPARATOR HAVING PERFORATED CAN WALL
Robert C. Patterson, Longmeadow, Mass., and Rudolph J. Micheller, East Granby, and John F. Carney, Windsor, Conn., assignors to Combustion Engineering, Inc., Windsor, Conn.
Filed Dec. 31, 1968, Ser. No. 789,049
Int. Cl. B01d 45/12
U.S. Cl. 55—452
7 Claims

ABSTRACT OF THE DISCLOSURE

A centrifugal separating apparatus comprising a cylindrical can body defining a spinning chamber in which vapor-liquid mixture is rotated at a high velocity to separate the entrained liquid by centrifugal action. The wall of the can body is provided along its length with two distinct perforated portions forming liquid discharge passages for the removal of separated liquid from the chamber. The perforated portion adjacent the inlet end of the chamber presents a liquid flow area substantially less than that of the other portion such that a vortical flow can be established and sustained in the process fluid.

BACKGROUND OF THE INVENTION

It is generally recognized in the art of vapor generation that drum internals employing vapor-liquid separating apparatus are required to minimize the moisture content of vapor produced in a vapor generator. One form of separating apparatus commonly employed in vapor generator installations, especially those of the nuclear operated type, is the centrifugal separator. In apparatus of this type, an upwardly flowing stream, containing a mixture of vapor and liquid, passes into the lower end of a spinning chamber defined by a vertically disposed, cylindrical can body. Within the chamber the mixture is imparted with a high velocity rotary motion whereby the denser, and thus heavier, liquid phase of the mixture is thrown radially outwardly toward the inner surface of the can body and is thereby separated from the lighter, less dense vapor phase of the mixture. The separated vapor flows upwardly through the central portion of the spinning chamber, while the separated liquid traverses the surface of the can body upwardly from whence it spills over the top edge thereof for return to the liquid reservoir within the vessel in which the separating apparatus is housed.

Due to the fact that the separated liquid must be conducted upwardly over the surface of the can body to be discharged from the upper end thereof, separating apparatus of this type are characterized by high pressure drop so that their use in high capacity vapor generators is prevented. Additionally, it has been determined that the separated liquid discharged from the top of the can body retains an appreciable amount of vapor which is returned to the liquid reservoir where it is recirculated through the vapor generator together with the circulating liquid. This recirculation of vapor through the vapor generator has a disruptive affect on circulation stability within the unit thus to detract from its over-all performance.

Therefore, the utilization of centrifugal separating apparatus in nuclear operated, natural circulation vapor generator installations requires the use of a large number of separators in order to adequately process the vapor generated therein. This fact, of course, increases the size of the vessel necessary to accommodate the separating apparatus and thereby results in higher fabrication costs for the installation.

It is to the alleviation of the above-mentioned problems that the present invention is directed.

SUMMARY OF THE INVENTION

It is a principal object of the present invention to provide an improved form of centrifugal separating apparatus characterized by reduced pressure drop and concomitantly the capability of processing greater amounts of vapor-liquid mixture to acceptable dryness as compared with centrifugal separating apparatus heretofore known in the art.

The novel separating apparatus of the present invention comprises a vertically elongated, cylindrical can body having a closed lower end and an open upper end defining a spinning chamber. The lower end of the can body is caused to communicate with a source of vapor-liquid mixture through an opening provided in the end closure forming an inlet to the spinning chamber. Fluid-spinning apparatus is disposed adjacent the chamber inlet and is adapted to impart a high velocity rotary motion to the mixture entering the chamber. Due to the rotary motion imparted to the fluid, the heavier components, thereof, namely liquid and any entrained particles, are caused to be flung radially outwardly against the inner surface of the can body by centrifugal action while the vapor continues to flow upwardly through the central region of the chamber to be discharged from the open upper end of the can body.

The wall of the can body is perforated along substantially its entire length with the perforations forming discharge openings through which the liquid separated from the mixture within the separation chamber is expelled therefrom to the vessel interior. According to the invention, the wall of the can body contains perforations arranged in two groups, the first adjacent the lower end of the chamber, presenting a reduced amount of open wall area which, while permitting the discharge of separated liquid, is sufficiently impervious to effect the establishment of a vortical flow within the process fluid. The second perforate portion extends from a point intermediate the ends of the can body to the top thereof and presents a substantially increased amount of open wall area through which the remaining body of separated liquid is expelled. Because the upper portion of the can body retains its cylindrical configuration while, at the same time increasing the amount of open area through which liquid can be expelled, the remaining fluid flowing in this region of the separator in constrained to retain its vortical flow characteristic such that centrifugal forces exis to fling the less dense liquid particles from entrainment with the vapor.

Centrifugal separatous constructed according to the invention are characterized by low pressure drop due to the fact that the separating liquid need not traverse the entire length of the can body prior to being discharged from the spinning chamber. Additionally, due to the fact that the separated liquid discharged from the chamber exist therefrom in discrete streams, any vapor entrained in the liquid is permitted to readily escape through the spaces disposed between adjacent streams.

Each of these features renders the disclosed separator apparatus particularly desirable for use in high capacity, nuclear operated vapor generators where the preservation of pressure in the vapor is critical owing to the necessity of maintaining adequate pressure heads to sustain fluid circulation through the unit. Because of the low pressure drop experienced by the fluid in flowing through the separators and the prevention of vapor recirculation through the unit, fluid circulation within the vapor generator is not impeded. Moreover, due to the increased capacity presented by the separator apparatus of the present invention, a lesser number of separators is required to process the fluid output of the vapor generator thereby reducing the size of the containment vessel required to house the unit.

DESCRIPTION OF THE PREFERRED EMBODIMENT

Figure 1:
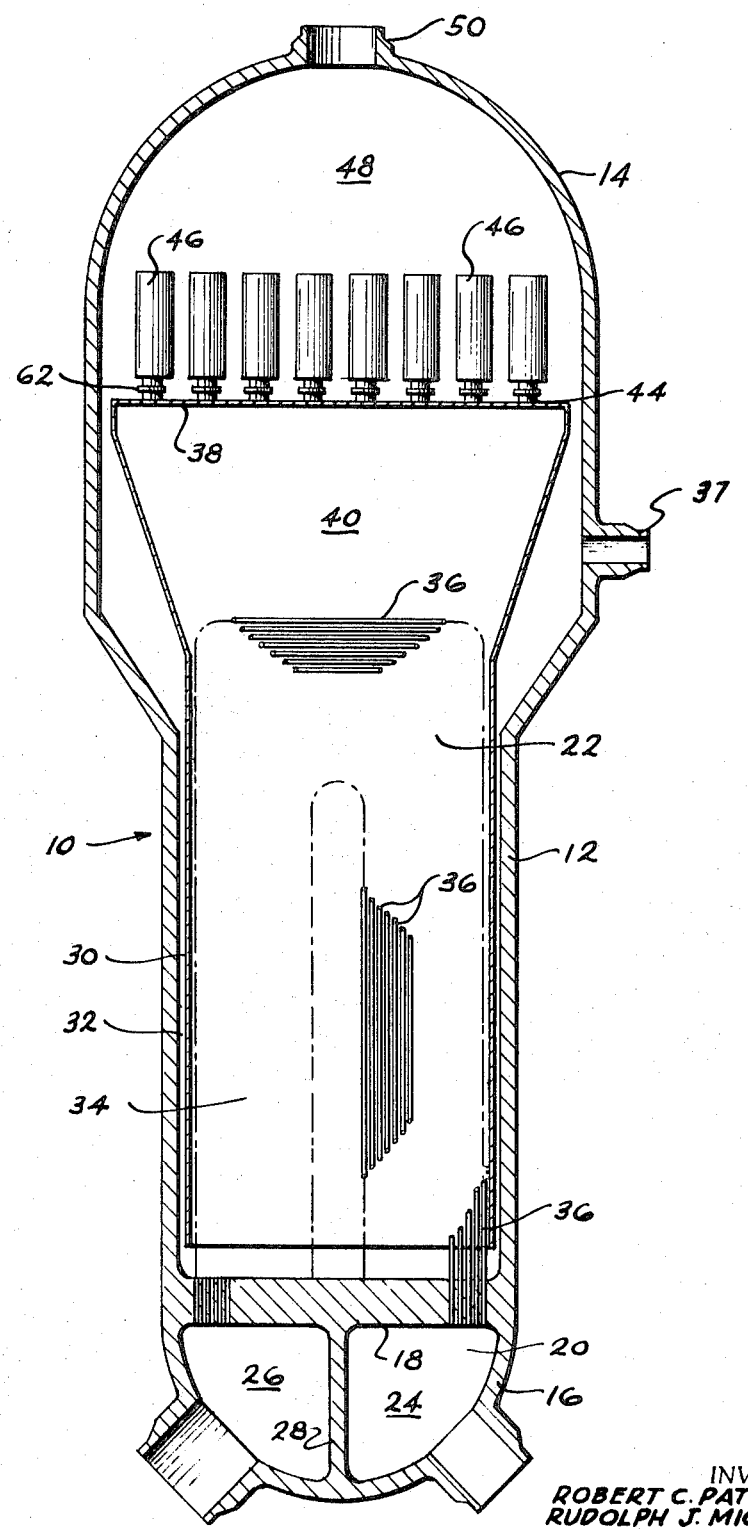
FIG. 1 is a sectional elevation of a nuclear operator vapor generator employing separating apparatus according to the invention.

Referring now to FIG. 1 of the drawing, there is shown a nuclear operated vapor generator 10 comprising an upright, generally cylindrical vessel 12 having dome-shaped upper and lower closure caps, 14 and 16 respectively. A tube sheet 18 is provided in the lower end of the vessel dividing its interior into a lower heating fluid chamber 20 and an upper vapor generation chamber 22. The heating fluid chamber 20 is separated into inlet and outlet portions, 24 and 26 respectively, by an upstanding partition plate 28, and appropriate connections are provided for circulating heating fluid into and out of the vessel. The vapor generation chamber 22 contains annular baffle means 30 dividing the chamber into an outer annular downcomer passage 32 and an inner riser section 34. A bundle of inverted U-tubes 36 whose ends are secured to the tube sheet 18 in communication with the inlet 24 and outlet 26 portions of the heating fluid chamber 20 is provided in the riser section 34 for passing heating fluid in heat exchange relation with vaporizable liquid that enters the vessel through an inlet 37. The vaporizable liquid admitted to the vessel is circulated through the downcomer passage 32 and riser section 34, in the latter of which a portion thereof is transformed into vapor. The upper end of the riser section 34 is closed by a horizontally disposed baffle plate 38 which, together with baffle means 30, defines a vapor-liquid mixture collection plenum 40. The baffle plate 38 is provided with a plurality of openings (not shown) to which are attached upstanding connecting pipes 44 for mounting separator apparatus 46 in communication with the collection plenum 40. Vapor-liquid mixture generated in the riser section 34 is processed by the apparatus 46 with the liquid separated therefrom being discharged downwardly onto the baffle plate 38 and thence to the downcomer passage 32 while the separated vapor is discharged upwardly to a vapor plenum 48 in the upper end of the vessel. A vapor outlet nozzle 50 communicates with the vapor plenum 48 for conducting the processed vapor to a point of use.

Figure 2:
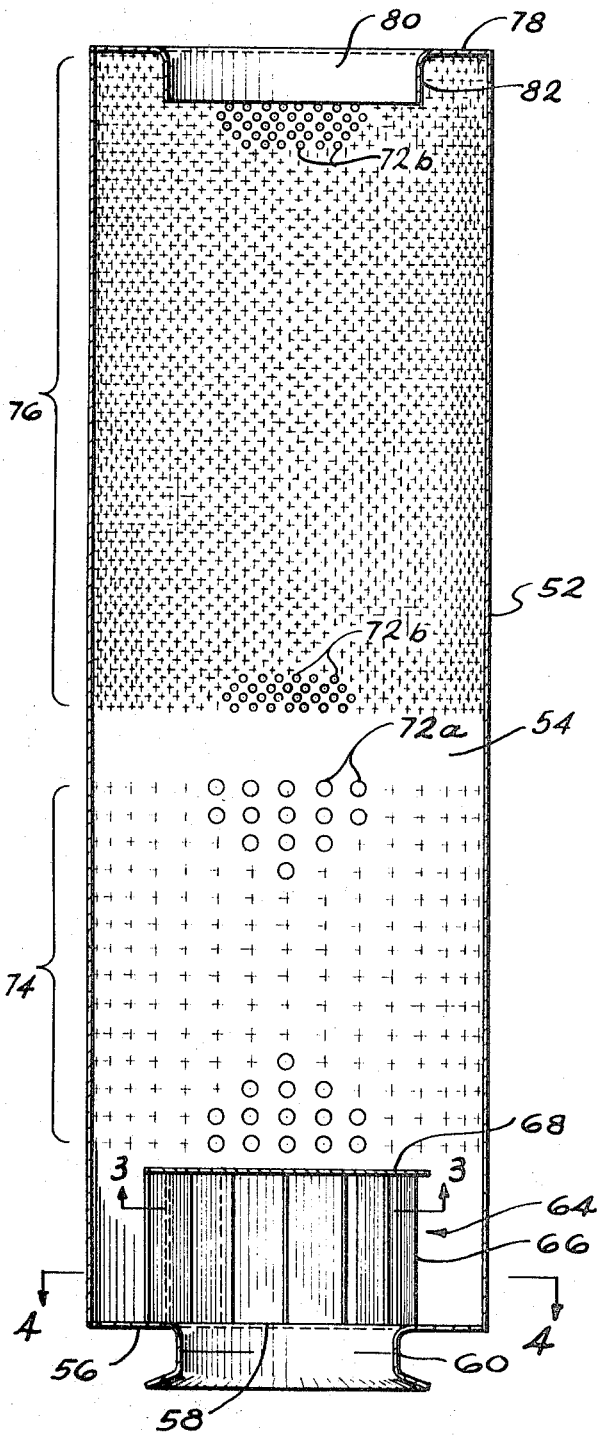
FIG. 2 is a vertical central sectional view of separating apparatus employed in the vapor generator of FIG. 1.

Referring now to FIG. 2, the separator apparatus 46 constructed according to the invention is illustrated in greater detail. As shown, it comprises a vertically elongated, hollow cylindrical can body 52 defining a spinning chamber 54 whose bottom end is closed by an annular base plate 56 having a central opening 58 from which a short tubular stem 60 depends. The stem 60 is adapted for mounting upon the upper end of a connection pipe 44 by an appropriate connector, such as the illustrated coupling clamp 62.

A tangential discharge spinner assembly 64 is disposed at the bottom of the spinning chamber 54 in overlying relation to the inlet opening 58 in the base plate 56. As shown, the spinner assembly 64 comprises a plurality of circumferentially spaced, upstanding, curvilinear vanes 66 that are attached at their bottom edges to the base plate 56 as by means of welding. The upper edges of the vanes 66 mount an annular closure plate 68 whose peripheral edge is radially spaced from the inner surface of the can body 52 to provide substantially unrestricted communication between the discharge ends of the vanes and that portion of the spinning chamber 54 above the spinner assembly 64.

Figure 4:
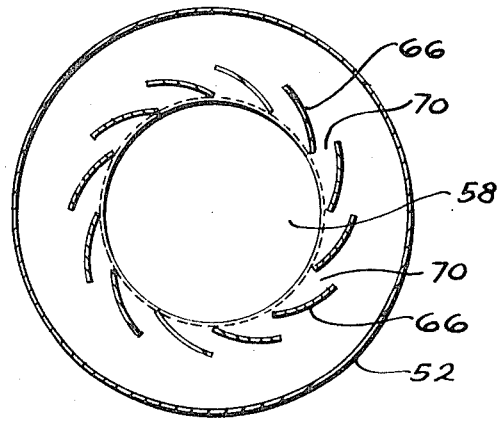
FIG. 4 is a sectional view taken along line 4—4 of FIG. 2.
Figure 3:
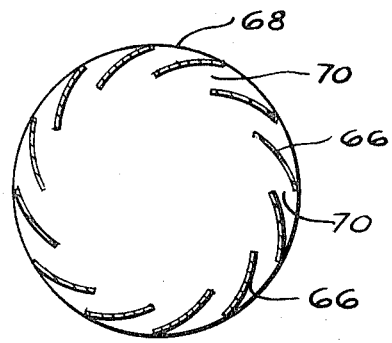
FIG. 3 is a sectional view taken along line 3—3 of FIG. 2.

As best illustrated in FIG. 4, the radially inner portions of the vanes 66 are contiguous with the opening 58 in the plate 56 and thus, together with the closure plate 68, form substantially horizontally extending, tangentially oriented flow passages 70 through which the vapor-liquid mixture entering the chamber 54 must pass. In flowing through the flow passages 70 the mixture is imparted with a high velocity spinning motion with the direction of the discharge streams from the passages being only slightly inclined from the horizontal. This spinning of the mixture causes the heavier, more dense elements, principally liquid and, to a minor extent, any entrained solids, to be flung radially outwardly against the inner surface of the can body 52 by centrifugal action. In this manner a layer of separated liquid having vortical motion is established on the surface of the can body, with the vertical component of the direction of flow of this liquid being upwardly. The vapor constituent of the mixture, being less dense than the liquid, is less affected by centrifugal forces and thus occupies the central region of the spinning chamber 54 in flowing toward the upper, discharge end thereof.

According to the invention, the can body 52 is provided along its length with circular through openings or perforations 72a and 72b adapted to discharge the separated liquid deposited on the surface of the can body externally of the spinning chamber 54 through the vapor plenum 48. The perforations are arranged in two groups, each occupying vertically spaced portions of the surface of the can body 52. The lower perforate portion, indicated as 74, extends from a level closely spaced from the closure plate 68 of the spinner assembly 64 to a level slightly less than midway of the length of the can body and contains a plurality of perforations 72a which are mutually spacedly disposed about the can body to present a perforate area that is significantly less than that presented by the perforations 72b contained in the upper perforate portion 76 which extends to the top of the can body. The diameter and spacing of the perforations 72a are selected to present an open wall area that is sufficient to pass a major portion of the separated liquid traversing the surface of the can body while, at the same time, being not so great as to disrupt the vortical character of the flowing liquid nor permit leakage of significant amounts of vapor through the can wall. Similarly, the diameter and spacing of the perforations 72b in the upper perforate portion 76 are selected to present an open wall area that is sufficiently great so as to pass essentially all of the remaining separated liquid while still confining the fluid flowing in this region of the spinning chamber in order to maintain the spinning character of its motion. By reason of this action, any liquid particle fines still entrained in the vapor flowing in this region of the spinning chamber will be acted upon by centrifugal forces to induce their removal from the vapor.

It has been determined that optimum results are obtained from separators constructed according to the invention wherein the portion 74 comprises $5/16$ inch diameter openings disposed on $3/4$ inch spacing and portion 76 comprises $1/8$ inch diameter openings disposed on $1/4$ inch spacing. Such configuration presents approximately 10% open wall area in portion 74 and 24% open wall area in portion 76.

In most applications it is found to be desirable to provide a top closure baffle 78 at the upper end of the can body 52. The closure baffle 78 complises an annular ring having a central opening 80 through which the separated vapor is discharged from the chamber. An annular lip 82 depends from the opening 80 and serves to form a barrier to impede the upward flow of any liquid film that may exist in this region of the chamber thus to induce radial discharge of the liquid from the chamber through the openings 72b.

There is thus provided by the present invention an improved form of centrifugal separating apparatus having increased vapor processing capacity as compared with centrifugal separators heretofore known in the art. This increased capacity is attributable to the fact that fluid flowing through the separator undergoes a more effective liquid separation process while experiencing less pressure drop than is experienced in the separators of the prior art. In comparable prior are separators the separated liquid was caused to traverse the entire height of the can wall prior to its discharge from the separation chamber; however, due to the presence of a perforated wall extending substantially throughout the height of the can, the separated liquid is discharged from the separation chamber without having to traverse the inner surface of the can. Removal of the separated liquid in this manner reduces the amount of kinetic energy required to overcome the friction force created between the flowing liquid and the can wall as well as the amount of energy necessary to convey the separated liquid through the interior of the apparatus.

Increased particle separation efficiency is achieved in the present inventionin part by the fact that in discharging the separated liquid from the interior of the apparatus in descrete streams, any vapor that may be entrained in the discharged liquid can readily escape therefrom through the spaces existing between the streams. Also, by arranging the liquid discharge openings in two longitudinally spaced perforate portions, more effective use of the separation chamber is achieved. By restricting the amount of open wall area in the lower region of the can wall, adequate liquid discharge area is provided to remove the bulk of the liquid separated in this region of the separator while at the same time providing sufficient surface upon which to establish vertical flow in the process fluid. By increasing the amount of open wall area in the upper region of the can wall and retaining the cylindrical configuration of the can body provides for discharge of substantially all of the remaining liquid as well as retaining the vortical nature of the fluid flow thereby to retain the existence of centrifugal forces within the flow in this region of the chamber to induce separation of the remaining particle fines from the vapor.

It will be understood that various changes in the details, materials, and arrangements of parts which have been herein described and illustrated in order to explain the nature of the invention may be made by those skilled in the art within the principle and scope of the invention as expressed in the appended claims.

What is claimed is:

1. A vapor-liquid separating apparatus comprising:
   (a) an axially elongated can body having an interior surface formed as a surface of revolution defining a spinning chamber;
   (b) a vapor-liquid mixture inlet disposed at one end of said spinning chamber and a vapor outlet disposed at the other end thereof in axially spaced relation from said mixture inlet;
   (c) means disposed at said mixture inlet for imparting a high velocity spinning motion to the mixture entering said chamber;
   (d) the wall of said can body being provided with a plurality of axially spaced perforate portions each including a plurality of rows of circumferentially sapced openings penetrating said wall for discharging separated liquid from said spinning chamber in discrete streams;
   (e) one of said perforate portions being disposed adjacent said spinning chamber inlet and cooperating with said spinning means to establish a vortical flow of fluid within said spinning chamber while discharging separated liquid and no appreciable separated vapor from said openings of said spinning chamber; and
   (f) another of said perforate portions being disposed adjacent said vapor outlet, the openings thereof being of a lesser diameter and spacing than those of said one portion and thereby presenting an open wall area substantially greater than that presented by said one perforate portion and operative to maintain a vortical flow of fluid adjacent said vapor outlet.

2. Apparatus for separating a mixture of vapor and liquid produced in a vapor generator as recited in claim 1 wherein said can body is formed as a right hollow circular cylinder.

3. Apparatus for separating a mixture of vapor and liquid produced in a vapor generator as recited in claim 2 wherein said can body is vertically arranged and having said mixture inlet disposed at the lower end thereof and said mixture spinning means comprises:
   (a) a plurality of upstanding, curvilinear vanes circumferentially spaced about the inlet end of said can body within the bottom of said spinning chamber; and
   (b) a closure plate mounted upon the upper edges of said vanes and forming therewith a plurality of outwardly discharging fluid flow passages having their discharge ends concentrically spaced from the inner surface of said can body.

4. Apparatus for separating a mixture of vapor and liquid produced in a vapor generator as recited in claim 3 wherein the wall of said can body includes a pair of said perforate portions, the lower perforate portion extending from a level immediately above said spinning means closure plate upwardly to a level intermediate the ends of said can body and the upper perforate portion extending throughout the remainder of said can body.

5. Apparatus for separating a mixture of vapor and liquid produced in a vapor generator as recited in claim 4 wherein said upper perforate portion contains more than twice the open wall area than said lower perforate portion.

6. Apparatus for separating a mixture of vapor and liquid produced in a vapor generator as recited in claim 5 wherein said lower perforate portion contains approximately ten percent open wall area and said upper perforate portion contains approximately twenty-four percent open wall area.

7. Apparatus for separating a mixture of vapor and liquid produced in a vapor generator as recited in claim 1 including an annular baffle plate disposed at the top of said can body and extending radially inwardly from the upper edge of said can body, said baffle plate including a central opening for the discharge of separated vapor from said spinning chamber.

References Cited

UNITED STATES PATENTS

| 1,784,627 | 12/1930 | Hamill | 55—455 X |
| 2,425,588 | 8/1947 | Alexander | 55—447 |

FOREIGN PATENTS

| 1,006,571 | 10/1965 | Great Britain | 55—204 |

FRANK W. LUTTER, Primary Examiner

V. H. GIFFORD, Assistant Examiner

U.S. Cl. X.R.

55—455; 122—491